(12) United States Patent
Stuck et al.

(10) Patent No.: US 9,378,445 B2
(45) Date of Patent: Jun. 28, 2016

(54) 3D LASER CODING IN GLASS

(75) Inventors: Alexander Stuck, Wettingen (CH); Stefan Klocke, Karlsruhe (DE); Paul Glendenning, Kandern (DE)

(73) Assignee: I-Property Holding Corp., Sarasota, FL (US)

( * ) Notice: Subject to any disclaimer, the term of this patent is extended or adjusted under 35 U.S.C. 154(b) by 27 days.

(21) Appl. No.: 14/125,505

(22) PCT Filed: Jun. 18, 2012

(86) PCT No.: PCT/US2012/042976
§ 371 (c)(1),
(2), (4) Date: Aug. 12, 2014

(87) PCT Pub. No.: WO2012/174545
PCT Pub. Date: Dec. 20, 2012

(65) Prior Publication Data
US 2014/0353381 A1    Dec. 4, 2014

Related U.S. Application Data

(60) Provisional application No. 61/498,119, filed on Jun. 17, 2011, provisional application No. 61/659,480, filed on Jun. 14, 2012.

(51) Int. Cl.
G06K 19/06 (2006.01)
B23K 26/04 (2014.01)
(Continued)

(52) U.S. Cl.
CPC ...... *G06K 19/06037* (2013.01); *B23K 26/0006* (2013.01); *B23K 26/048* (2013.01);
(Continued)

(58) Field of Classification Search
CPC .............. G06K 19/06037; G06K 19/06159; G06K 7/1426; B41J 2/442; B41M 5/24; B41M 5/262; B41M 5/267; B41M 3/14; C03C 23/0025
USPC ............. 235/494, 454, 462.11, 462.41
See application file for complete search history.

(56) References Cited

U.S. PATENT DOCUMENTS 5,801,356 A    9/1998  Richman
5,984,901 A *  11/1999  Sudo et al. .................. 604/227
(Continued)

OTHER PUBLICATIONS

U.S. Patent and Trademark Office, International Search Report and Written Opinion in corresponding International Patent Appliction No. PCT/US2012/042976, mailed Aug. 30, 2012 (9 pages).

(Continued)

*Primary Examiner* — Paultep Savusdiphol
(74) *Attorney, Agent, or Firm* — Wood, Herron & Evans, LLP

(57) ABSTRACT

This inventive method assures the authenticity of drugs or other valuable substances that reside within product containers, such as syringes. The method includes initially measuring the 3D topology of the glass surface while determining the distance to the glass surface. Thereafter, a desired 3D code is written below the glass surface with a pulsed laser system. The written 3D code is readable using optical coherence topography (OCT) or parallel optical coherence tomography (pOCT) to verify the authenticity of the product container. A system uses this method with a plurality of syringes held within a tray, and a writing apparatus that moves relative to the tray to write a predetermined 3D code on each of the syringes held in the tray, during processing of the syringes along a process line while in the tray.

14 Claims, 7 Drawing Sheets

CODE 1

CODE 2

(51) Int. Cl.
   *B41M 5/26* (2006.01)
   *G06K 1/12* (2006.01)
   *B41J 2/44* (2006.01)
   *G06K 7/10* (2006.01)
   *G06K 7/14* (2006.01)
   *B23K 26/00* (2014.01)
   *B41M 3/14* (2006.01)

(52) U.S. Cl.
   CPC .............. *B41J 2/442* (2013.01); *B41M 5/262* (2013.01); *G06K 1/126* (2013.01); *G06K 7/10861* (2013.01); *G06K 7/1417* (2013.01); *G06K 7/1426* (2013.01); *G06K 19/06093* (2013.01); *B23K 2203/42* (2015.10); *B23K 2203/50* (2015.10); *B41M 3/14* (2013.01)

(56) References Cited

U.S. PATENT DOCUMENTS

| | | | | |
|---|---|---|---|---|
| 6,189,292 | B1 * | 2/2001 | Odell et al. | 53/425 |
| 6,263,641 | B1 * | 7/2001 | Odell et al. | 53/425 |
| 6,792,743 | B2 * | 9/2004 | Odell et al. | 53/452 |
| 7,551,293 | B2 | 6/2009 | Yelin et al. | |
| 7,604,173 | B2 | 10/2009 | Kersey et al. | |
| 7,675,001 | B2 * | 3/2010 | Leyvraz | 219/121.68 |
| 7,705,870 | B2 * | 4/2010 | Sato | 347/240 |
| 7,856,795 | B2 * | 12/2010 | Grimard | 53/411 |
| 8,196,807 | B2 * | 6/2012 | Grimard | 235/375 |
| 8,647,721 | B2 * | 2/2014 | Gasworth et al. | 427/554 |
| 2002/0069616 | A1 * | 6/2002 | Odell et al. | 53/425 |
| 2004/0177032 | A1 * | 9/2004 | Bradley et al. | 705/38 |
| 2005/0150944 | A1 * | 7/2005 | Melick et al. | 235/375 |
| 2005/0166547 | A1 * | 8/2005 | Monti | 53/282 |
| 2005/0218126 | A1 * | 10/2005 | Leyvraz | 219/121.69 |
| 2007/0086822 | A1 * | 4/2007 | Sato | 400/129 |
| 2007/0152032 | A1 * | 7/2007 | Tuschel et al. | 235/375 |
| 2007/0152056 | A1 * | 7/2007 | Tuschel et al. | 235/454 |
| 2007/0200335 | A1 * | 8/2007 | Tuschel et al. | 283/72 |
| 2007/0221732 | A1 * | 9/2007 | Tuschel et al. | 235/462.01 |
| 2007/0241177 | A1 * | 10/2007 | Tuschel et al. | 235/375 |
| 2008/0017722 | A1 * | 1/2008 | Snyder et al. | 235/494 |
| 2008/0304525 | A1 * | 12/2008 | Kupisiewicz et al. | 372/30 |
| 2009/0159174 | A1 * | 6/2009 | Grimard | 156/64 |
| 2009/0159654 | A1 * | 6/2009 | Grimard | 235/375 |
| 2010/0040836 | A1 * | 2/2010 | Li et al. | 428/187 |
| 2010/0112317 | A1 * | 5/2010 | Gasworth et al. | 428/201 |
| 2010/0245105 | A1 * | 9/2010 | Smith | 340/669 |
| 2010/0298738 | A1 * | 11/2010 | Felts et al. | 600/576 |
| 2011/0091068 | A1 * | 4/2011 | Stuck et al. | 382/103 |
| 2011/0183712 | A1 * | 7/2011 | Eckstein et al. | 455/556.1 |
| 2014/0064308 | A1 * | 3/2014 | Mysliwitz | 372/25 |

OTHER PUBLICATIONS

The International Bureau of WIPO, International Preliminary Report on Patentability and Written Opinon of the International Searching Authority in copending International Patent Application No. PCT/US2012/042976, issued Dec. 17, 2013 (8 pages).

* cited by examiner

3D LASER CODING IN GLASS

CROSS-REFERENCE TO RELATED APPLICATIONS

This application is a national phase entry under 35 U.S.C. 371 and claims priority to International Application No. PCT/US2012/042976, filed Jun. 18, 2012 (pending), which claimed priority to U.S. Provisional Patent Application Nos. 61/659,480 filed Jun. 14, 2012 (expired) and 61/498,119 filed Jun. 17, 2011 (expired), each of which is expressly incorporated by reference herein, in its entirety.

RELATED APPLICATIONS

This application claims priority to U.S. Provisional Patent Application Nos. 61/659,480 filed Jun. 14, 2012, and 61/498,119 filed Jun. 17, 2011, each of which is expressly incorporated by reference hearing, in its entirety.

FIELD OF THE INVENTION

The present invention relates to method and/or apparatus for assuring the authenticity of drugs or other substances packaged in glass or plastic containers, particularly syringes.

BACKGROUND OF THE INVENTION

Manufacturers and suppliers of drugs and other valuable substances packaged in glass containers, e.g. syringes, have a need to track and trace these containers through their manufacture and their eventual supply to end users, and to ensure that these containers are not counterfeited or faked. This problem is in fact not only applicable to glass, but also to containers made of other materials such as plastics. These needs arise because the manufacturers and suppliers must ensure the following.
  The genuine and correct contents arrive at the correct locations.
  Product containers can be traced back through the supply process stages for verification or troubleshooting.
  Product containers cannot be counterfeited, which would result in the wrong substance being delivered to a customer.
  The wrong genuine article cannot end up in the wrong location or with the wrong person.
  Customers have complete confidence that none of these above-stated problems has occurred, because there is a secure system in place.
To achieve an accurate track and trace system requires indelible marking of the product containers. Methods must be available to reliably apply and read the markings at the required locations and by the required people. To secure against counterfeiting requires that the marks should be encoded and decoded in a controlled manner, in such a way that they can be readily verified as genuine and correct.

In many situations the glass product containers are packed into an even larger container, such as a box or carton. For these situations, it is desirable that each of the glass-packaged products should be individually identifiable, such that the correct items are known to be in the correct box at specified stages in the production process and in the supply chain.

Methods of marking glass products for security purposes include printing methods and laser marking methods on the surface of the material. Usually these processes use a code for track and trace purposes.

Ink-jet printing technology is one process for coding products for track and trace purposes. This has been applied in the pharmaceutical industry on various substrates including glass, to create numerical codes and bar codes. (ref Marking & Coding Solutions for Pharmaceutical Applications, Videojet Technologies Incorporated, https://my.videojet.com/videojet/distributors/documents/support/Brochures/v-pharma-flyer.pdf)

A long-wave $CO_2$ laser with scanning optics has been used to engrave a translucent data matrix code onto the surface of glass syringe barrels. The code is 2×2 mm in size comprising a 14×14 data matrix. It is optically read using a camera with back-lighting, and read as a black & white code by image processing software. (ref Pharm. Ind. 71, No. 10, 1770-1774 (2009) and Pharm. Ind. 71, No. 11, 1945-1948 (2009); ECV Editio Cantor Verlag, Aulendorf, Germany). Data matrix codes of 1×1 mm size have also been laser etched onto the finger rest of the syringe. (ref: http://www.gerresheimer.com/en/products-services/news/event-news/eventnewssingle0/article/laser-encoding-gives-syringes-and-vials-an-indelible-id.html)

In another application, green lasers have been used to mark anti-fake labels below the surface of glass bottles for security purposes. (ref Wuhan Lead Laser Co, China http://leadlaser4.en.made-in-china.com/product/RMpE-goOFCikU/China-Green-Laser-Subsurface-Engraving-Flying-Surface-Marking-Machine-LD-EG-F3005-.html).

U.S. Patent Publication No. 2010/0119808 teaches that changes to the refractive index inside glass have been achieved using radiation having a wavelength of up to 400 nm to form subsurface marks up to 50 µm in size. No microcracks are created in the glass and no surface marking occurs. The subsurface marks can be created in a range of 20 to 200 microns below the outer surface of the glass. This '808 publication is expressly incorporated by reference herein, in its entirety.

Remelted glass zones can be created inside bulk glass using a pico-second laser. These zones result in a local refractive index change. (Ref Evaluation Of Non-Linear Absorbtivity In Internal Modification Of Bulk Glasses By Ultra-Short Laser Pulses, by Isamo Miyamoto, Christian Cvecek, Michael Schmidt, Optics Express, 23 May 2011/Vol. 19, No. 11, which is expressly incorporated by reference herein, in its entirety.)

U.S. Pat. Nos. 6,573,026 and 6,853,785 teach that patterns can be created in bulk glass substrates by using a femtosecond laser to modify the refractive index. The pulsed laser beam is translated along a scan path to change the refractive index without resulting in any laser induced physical damage of the material. Each of these '026 and '785 patents is expressly incorporated by reference herein, in its entirety. Also, International Patent Publication No. WO2007/033445 teaches the use of a femtosecond laser to mark codes inside the glass wall of a syringe, to track the products. This '445 publication is also incorporated by reference herein, in its entirety.

A number of optical detection devices useful for analyzing three dimensional structures are known. White light interferometers represent one example of the current state of the art, but they are rather slow. Optical coherence tomography (OCT) is another known technique for measuring a three dimensional pattern, even if the pattern is located at an interface below the surface of an article. OCT is sensitive to changes of index of refraction, surface/interface topologies and absorption. U.S. Pat. No. 6,469,489 describes an array sensor used for parallel optical low coherence tomography which enables real time 3D imaging for topographic and tomographic structures. It provides fast, three dimensional and structural information with spatial resolution in the micrometer range. In depth OCT can achieve resolutions between 10-100 nm for high quality surfaces. For rough surfaces, or strongly scattering systems, the depth resolution is usually between 1-10 micrometers. A plurality of electrical detection circuits with parallel outputs can form a one-dimensional or two-dimensional array sensor for the coherent or heterodyne analog detection of intensity modulated optical signals simultaneously for all pixels with a high dynamic range. The array sensor may be used for optical 3D measurements, and especially in optical low-coherence tomography. OCT is known for investigating the human skin, to control the quality of fast production processes, in SMD pick and place systems, as well as in mechanical inspection systems. Instead of using a time-modulated interferometric signal, frequency domain OCT uses a broad band light source and advanced Fourier analysis to provide very fast and accurate 3D images of objects, such as the human retina. Although fast, frequency domain OCT suffers from a limited depth range. Variants of these detection techniques do not use interferometry, but time-modulated optical signals to measure the distance to an object accurately. The '489 patent is expressly incorporated by reference herein, in its entirety.

At present, all known solutions for marking and measuring glass product containers, i.e. bottles, vials and/or syringes, are controlled by normal 2D cameras with strong illumination to make the markings visible to the camera. This is done because of the high production speeds required in production, which lies between 60-600 pieces per minute. It is currently nearly impossible to measure 3D patterns at such speeds and the usual solutions are therefore limited to 2D patterns and 2D inspection. However, these inspections suffer from several severe drawbacks, as identified below.

1. Inaccuracy of depth of code, as the depth is not measured.
2. Low production yield because of light reflected from surfaces which sometimes makes reading of the codes with normal cameras very difficult.
3. In printed systems and surface engraving, which give good image contrast, there is the danger of particle contamination.

SUMMARY OF THE INVENTION

The present invention uses a laser beam (eg from picosecond or femto second laser) to create features inside the product, (also referred to as the product container) below the surface, wherein the features are 3-dimensional and on the order of 0.5-50, 1-10, 1-20, 5-20, 5-30, 5-50 μm in size. The product may be glass or plastic. The features may be micro-cracks, changes in density or refractive index, or small bubbles or voids. In the context of this specification these features are called marking spots. Micro-crack features and bubbles can also be created inside glass using ns and ps pulses. Density changes are created by fs and ps laser pulses. Laser pulse durations are 1-10 ps, 100 fs-1 ps and 10-20 ps. Typically a pulse train (i.e. a well defined sequence of pulses) can be used to generate each marking spot.

By changing the focus position of the laser, or moving the position of the glass, this invention can be used to create the above features at different depths (in different depth layers) in the glass. Thus, a 3-dimensional pattern of features in the glass can be produced, with a precision between 1-10, 1-20, 1-30, 5-20, 5-30, 5-40 and 5-50 microns. This pattern may or may not be visible to the naked eye. In order to separate the different depths, the depth step between each depth layer should be at least a quarter the average size of the microscopic laser marking feature or larger.

Using optical measuring techniques, such as optical coherence tomography (OCT), and in particular time-domain parallel OCT (pOCT), it is possible to measure the features inside the glass in all three dimensions and to construct within the computer software, i.e. to store in memory, the measured 3D pattern formed in the product. Other OCT techniques, such as frequency domain OCT, and single channel OCT can also be applied in such a way that the laser marks are read in 3 dimensions. This can then be read as a sequence of different lateral positions and depths.

OCT is especially suited to accurately measuring features inside the glass which are due to local changes in index of refraction, i.e. small density changes. Codes made with such small density changes can be such that they are invisible to the human eye or normal 2D cameras. This is particularly true if the code does not create diffraction effects (for example because the features are too coarse i.e. larger than 3 microns and/or are not arranged sufficiently regularly to produce diffraction). The OCT method is also excellent for detecting and measuring 3D patterns of tiny microscracks that cause light scattering.

Two or more distinct depth levels can be used to create a digital code. From the top surface, the pattern could be seen as a 2D barcode, or a regular pattern without apparent code although it is in fact created in 3D inside the glass and contains the code. With more than two depth levels, a more complex code is possible.

Having a fast 3D optical measuring technique available also allows measuring the distance to the glass surface accurately within a precision of 30 microns or better. It also allows measuring the glass curvature and flatness. These can be taken into account during the laser writing step to enhance the regularity of the laser markings.

A typical process sequence in writing and reading the 3D code on a product, according to the present invention, involves the following:

1. Measuring the 3D topology of the glass surface of the product within less than 1s and determining within an accuracy of 30 microns or better, the distance from an inspection system, i.e. the writing apparatus, to the surface.
2. Writing a predetermined 3D code below the surface of the product with a short pulsed laser system, preferably using a 1-20 ps, 20-100 ps or a ns or a 100 fs-1 ps laser, with one or several laser pulses used to make the markings.
3. Reading, with a 3D measuring system, the 3D code that has been written below the surface of the product, for example with OCT or pOCT or a variant thereof, thereby to verify the product.
4. if the code cannot be read, repeating steps 1-3 or 2-3 on the same product to minimize rejects or to mark the product as a reject.

The use of a 3D code in this manner has the following advantages over existing solutions:
  it is very difficult to copy
  it is difficult to decode except by those with the required equipment and authorization.
  it is tamper-proof.
  defects on and in the glass can be more easily distinguished from the laser markings, thereby making the reading and writing step more reliable than with conventional 2D camera systems.
  the 3D code is secure from external damage.

Because pOCT uses a time modulated optical signal as a reference, reading errors due to wrong reflexes and additional illumination is strongly reduced.

DETAILED DESCRIPTION OF THE PREFERRED EMBODIMENT

Figure 1:
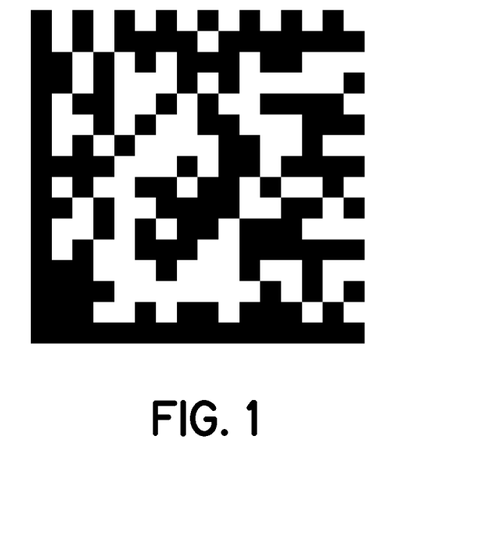
FIG. 1 is a schematic which shows, in exemplary form, a 2D datamatrix code.

FIG. 1 shows a 2D datamatrix code. The black/white contrast in glass can be generated by laser writing. Small gas bubbles or melted and solidified glass zones written by short pulse lasers give an image contrast in 3D OCT tomography. The white and black regions can be readily distinguished by having a different kind of laser point arrangement. As a way of example, a black region could be n laser points (where n is a natural number including 0) at one level below the glass surface and the white region could be an arrangement of m laser points (where in is a natural number including 0) at a different depth below the glass surface. Combinations of k distinct depth levels within the same digital region (i.e. black/white) are also possible. Advantageously k lies between 1-10.

Figure 2:
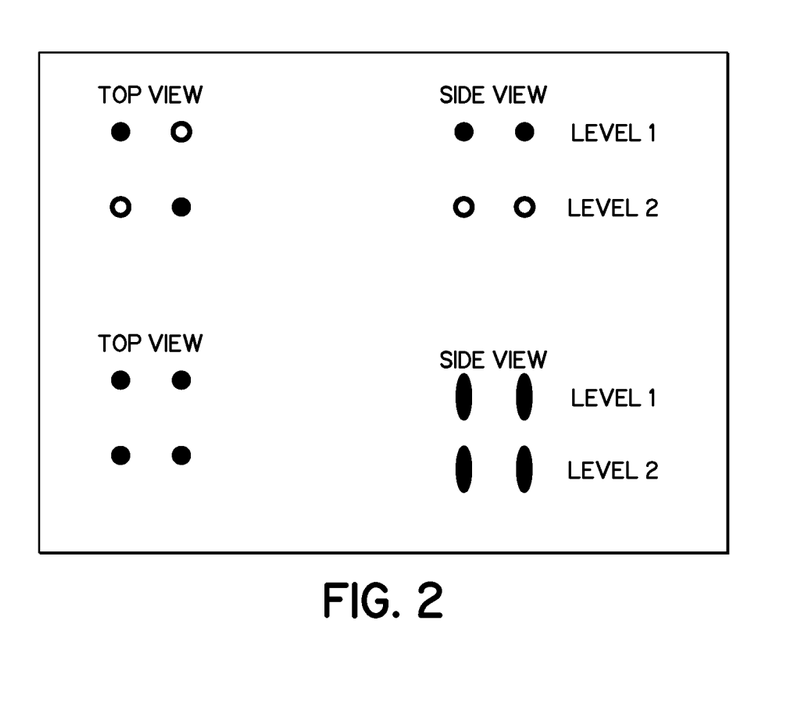
FIG. 2 shows, in schematic form, two different possibilities for a group of laser created spots on the product container.

FIG. 2 shows two different possibilities for arranging a group of laser spots on 2 depth levels below the glass. In this case the 4 points all denote the same black or white square in the datamatrix code. The number of points does not need to be four and the points need not be at the same distance or arranged in a square. Other arrangements would also be possible.

Figure 3:
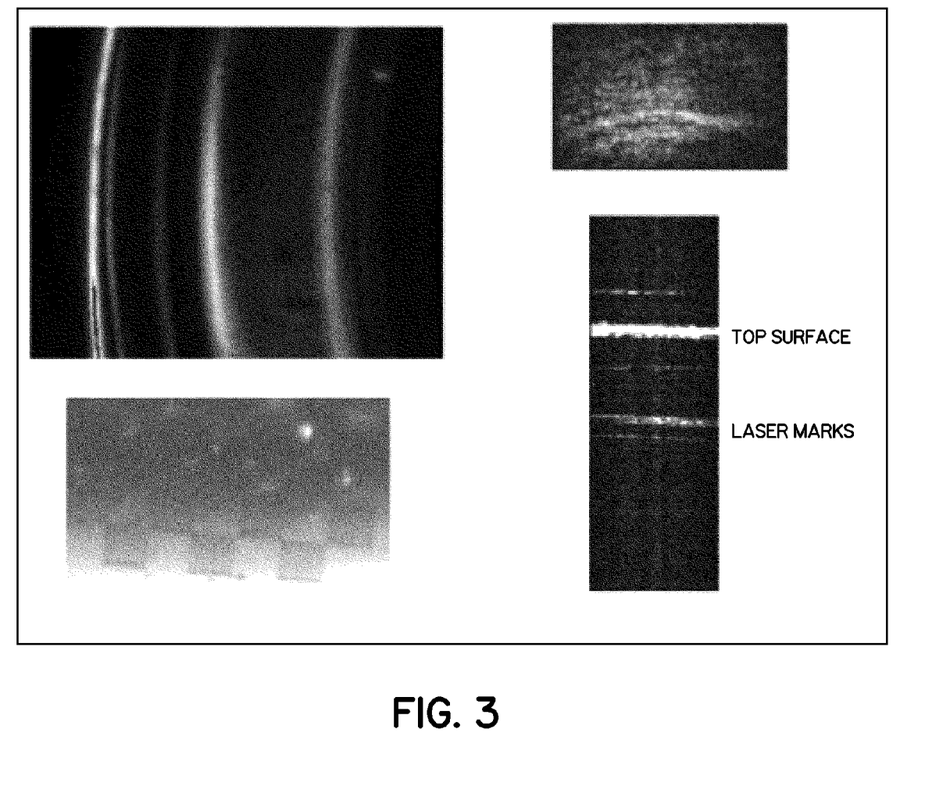
FIG. 3 includes photographic reproductions which show optical microscopy and pOCT measurements of laser written marks inside the glass body of a syringe.

FIG. 3 shows optical microscopy (left) and pOCT measurements (right) of laser written marks inside the glass body of a syringe. The optical microscopy images on the left show a chessboard pattern of marks written by the laser, but not the depth of the pattern. The black & white images from the pOCT show one of the squares in the pattern from above (upper right), and a cross-section (lower right) through the glass. The cross-section shows the top surface of the syringe as strong signal line, and the laser written marks as a lower contrast line below the surface.

Figure 4:
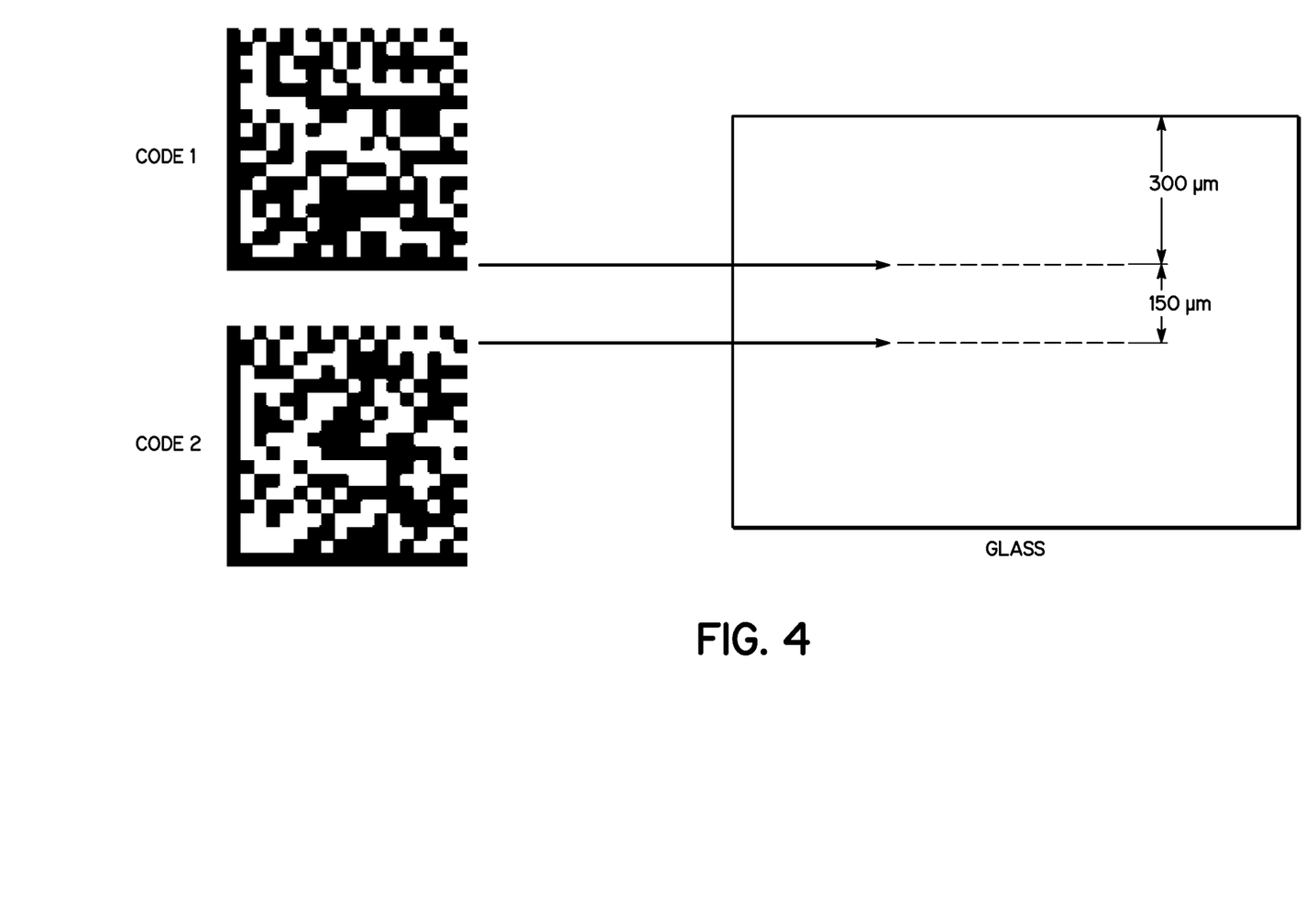
FIG. 4 shows an example of 2D barcodes written below one another, at different levels, within the glass container.

The present invention contemplates the use of two or more 2D barcodes written at different depths. For instance, one variation of the invention would be to write a 2D barcode at the surface or within the volume of the glass, at a second level below the surface. This is shown in FIG. 4. Then above or below, (or perhaps even at the same level beside this first code) a second code is written which acts as a digital verification signature, and is encrypted.

This encrypted second code can be a 2D bar code but is not limited to such a code. Other examples include a random verification pattern, a linear bar code, a digital image, a readable text, or a number block, at different levels below each other inside the glass. A normal 2D bar code would be readily readable for tracking information, and the second code would be a cryptographic signature readable only with a secret key. This could contain, for example, an encrypted product identity to verify that the product is genuine. In this case, the system would work similar to a digital signature of an e-mail or an electronic picture, where the mail content is actually readable to everyone, but the signature is genuine and verifiable by cryptographic means.

One further variant is that the cryptographic code, i.e. "digital signature," is written first by the laser into the glass and then the overt barcode containing the open information is written directly above this code. Such an arrangement would prevent the cryptographic code from being tampered with because any laser beam used to tamper with the cryptographic code would need to pass through the overt code and would be scattered and diffracted thereby, making it exceedingly difficult to control a rewriting of the cryptographic code. If the code is in or at the edge of the flange of a syringe, it is even more geometrically difficult to write with a laser from below Therefore such a system would be extremely tamperproof.

The present invention also contemplates the use of diffractive optics, scanner, or a beamsplitter to write at multiple points simultaneously.

Figure 5:
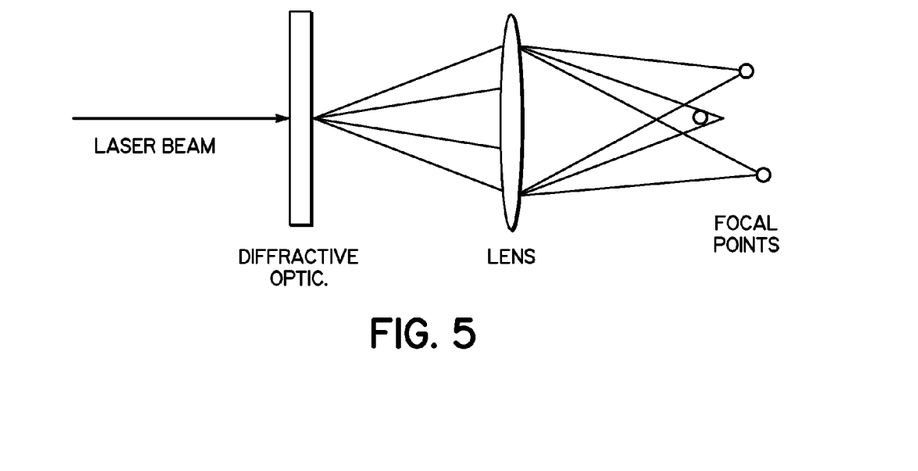
FIG. 5 is a schematic which show the use of diffractive optics to create multiple focal points from a laser beam.

Each point can be written multiple times using a diffractive optic, so that many points close together are produced simultaneously as a 3D point cloud, as shown in FIG. 5. Because this depends on the specific optic used, this is extremely difficult to copy. Depending on the design of the diffractive optics, multiple convergent or divergent beams can be produced, allowing identical or different focus depths to be created simultaneously.

A similar effect can be created using a high speed scanner (active mirror) or a beam splitter optic. However, in this latter case, only a few points would be created at one time. The invention contemplates creating pixels inside the glass, the pixels comprising fine lines of micro cracks.

Figure 6:
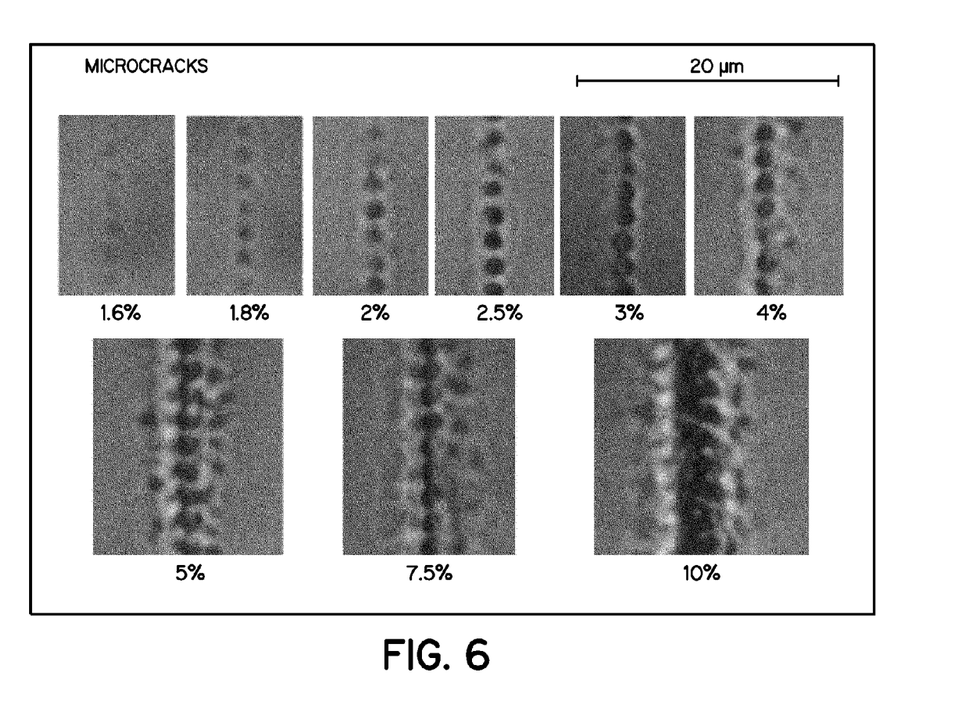
FIG. 6 includes photographic reproductions which show microcracks created in glass by using a ps laser, at different percentages of average power.
Figure 7:
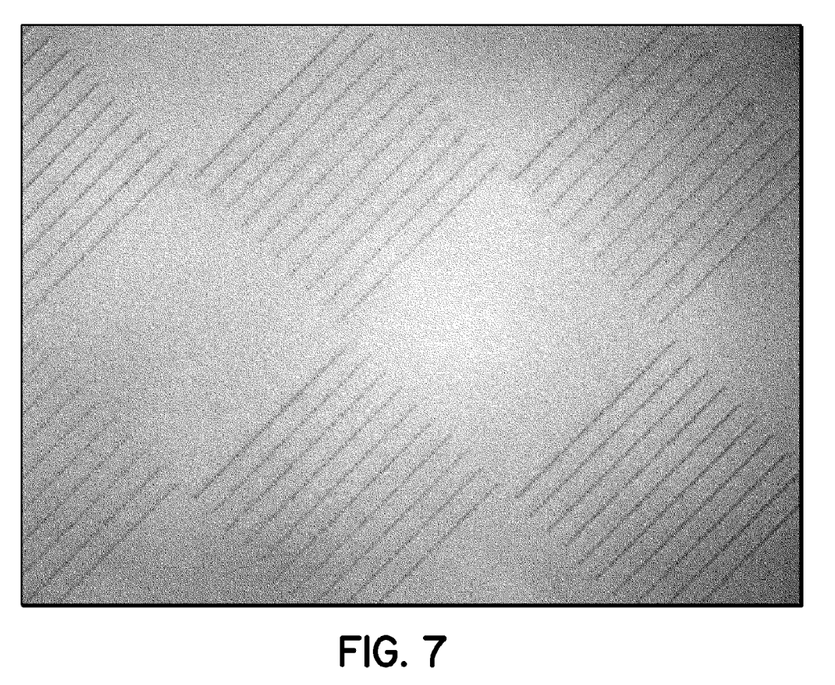
FIG. 7 is a photographic reproduction which shows 100 μm wide square "pixels" written into glass at a depth of 200 μm, using lines made of microcracks.

Pixels in a datamatrix barcode or other pattern can be created using a ps laser, by writing lines made up of rows of 5 μm long microcracks, eg 50-100 μm pixels containing 10, 20 or more such lines. The precision level of the laser is such that it is possible to write between and below these lines at deeper levels within the glass. FIG. 6 shows microcracks produced in the glass at different power levels. The cracks are produced using the laser at a low repetition rate (10 KHz), and a feed rate of 20 mm/sec with a pulse energy of 20-3 μJ. The size of the microcracks changes with the power level used. FIG. 7 shows square pixels made up of 5 μm wide lines, where each line is a row of 5 μm long microcracks.

Figure 8:
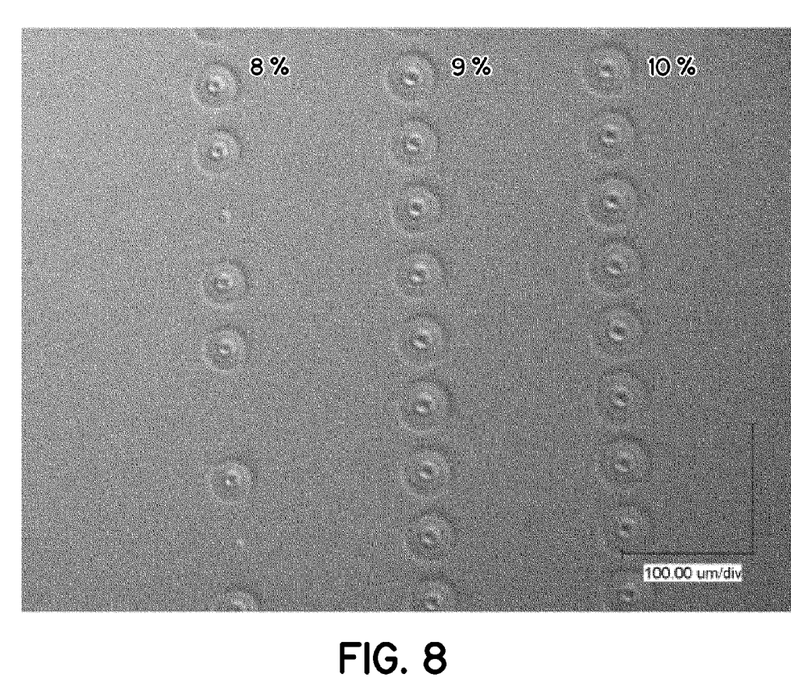
FIG. 8 is a photographic reproduction which shows microdata in glass at 200 μm in depth, made up of remelted zones, produced by a ps laser at different percentage levels of average laser power.

By changing the process parameters it is possible to produce microdots formed from remelted zones in the glass. A higher repetition rate and feed rate (1 MHz and 1 mm/sec) can be used here, compared to that of microcracks. FIG. 8 shows microdots made up of remelted zones, produced at different percentage levels of average laser power. The microdot formation threshold in this example is about 2.2 W. Minimum size of microdot farmed here is about 40 µm.

Notably, the curvature of a glass flange creates an immersion lens effect. More specifically, the curvature of a glass surface, such as the top surface of a syringe flange, creates a refraction effect on a laser beam. For instance, in FIG. 9, on the left and lower images, the thick grey-white square is part of the top surface of a syringe flange. The chess-board pattern seen is a pattern of laser-written marks within the glass. The centre top image shows a vertical view of part of the chess-board. The far right image is a cross-section view showing the curved top surface (thick white line) and the curved laser-written pattern in the glass below.

Figure 9:
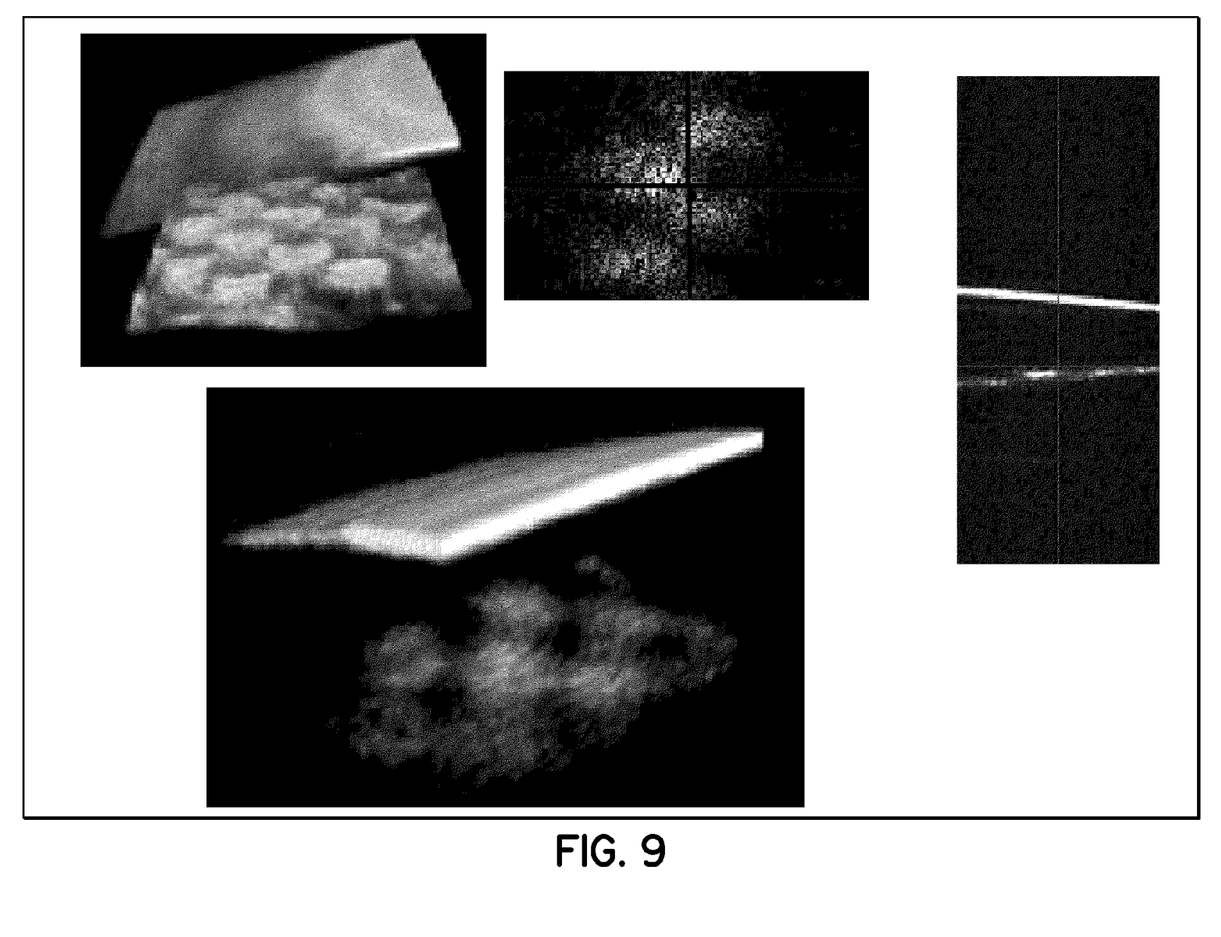
FIG. 9 is a photographic reproduction which shows the lens effect caused by a curved top surface of glass, shown by images of pOCT measurement.

This effect can be used to create points inside the glass that are closer together, due to the lens effect, and also smaller in focus. This effect can also be used to create a curved (non-planar) pattern or barcode where marks or patterns appear optically to overlap. This makes a pattern or barcode very difficult or impossible to read using an optical microscope, but the pattern can be read easily using a pOCT system.

Figure 10:
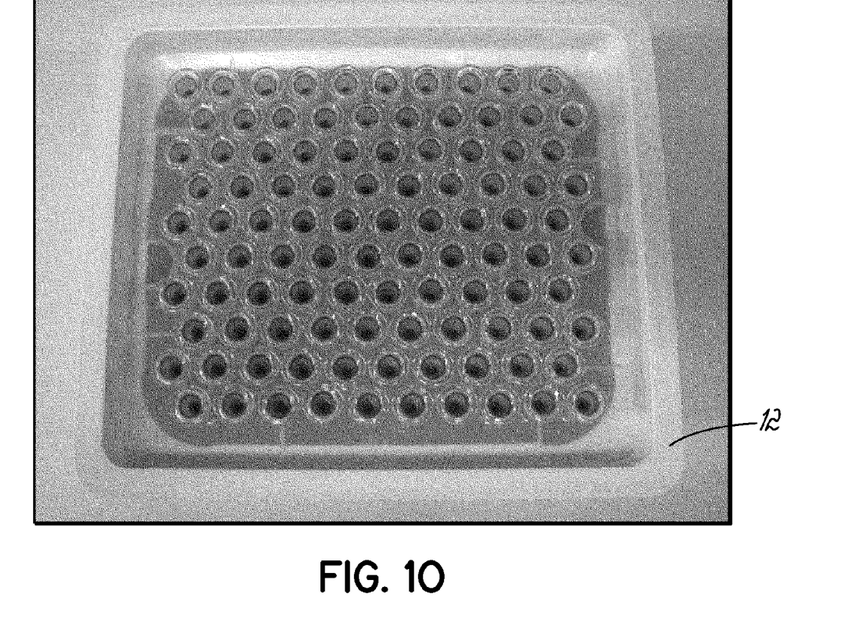
FIG. 10 is a photographic reproduction which shows a blister nest, i.e. a tray, with glass syringes, as seen from the top.

These concepts can be used to code the flanges of glass syringes that are located within a transport nest, such as used in production. More specifically, during production and filling, syringes are often transported in a plastic tray 12 or 'nest' that holds, for example, 100 syringes. This is shown in FIG. 10. If the code is written from the top into the flange of each syringe held in the tray 12, the syringe does not have to be removed from the nest during the writing process.

Figure 11:
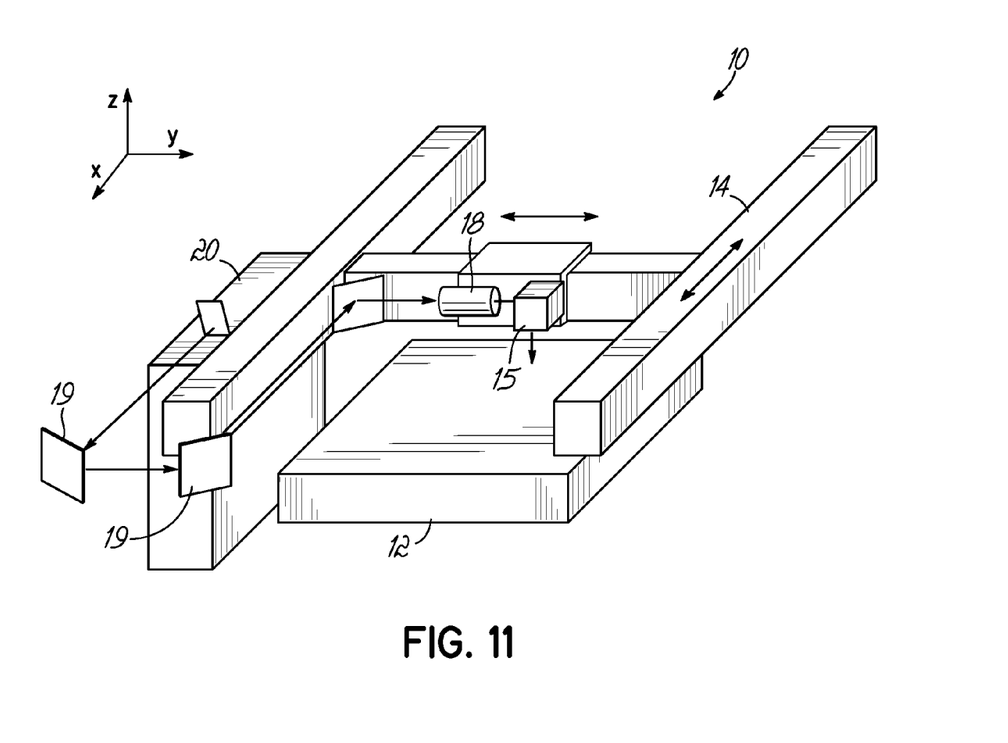
FIG. 11 is a schematic which shows a conceptual layout of a system for the internal marking of the flanges of syringes located in a nest.

FIG. 11 shows a conceptual layout for such a system 10, wherein a nest 12 of syringes is positioned below the axes of a frame 14 that moves relative to the tray 12, to move each of the syringes in alignment with a writing apparatus 15 that is mounted on the frame 14. The writing apparatus includes a measuring device for measuring the distance to the surface of the syringe that is aligned therewith and also the contour, i.e. the flatness, of the surface. The writing apparatus 15 includes a laser device 18, further including mirrors 19 and a laser source 20. Preferably, a laser beam is directed via the mirrors 19, via a scanner, toward the flange of the aligned syringe for laser marking. Preferably, the writing apparatus 15 includes a reading device, such as a pOCT measurement head, to readily verify that the correct 3D code has been written on the aligned syringe. With multiple syringes in each tray, and a series of trays conveyed past the frame 14, a significant number of syringe containers can be marked with a predetermined 3D code in a relatively short time window. Preferably, further upstream from the frame 14, along the same process line, the syringes are filled and closed while located in the same tray 12. This assures that filling, sealing, and then 3D coding, and even subsequent verification thereof, can occur sequentially along the same process line, which assures the authenticity of the substances in the syringes. Preferably, the 3D code is also identified with a master controller, to keep track of the specific substances that are associated with the predetermined 3D code.

Although this specification shows and describes a number of preferred embodiments of the invention, those skilled in the art will appreciate that this invention itself is not limited to the specific details shown or described. Rather, the invention is susceptible to reasonable modification and permutation within the scope of this disclosure, and the following claims are not to be interpreted as solely encompassing the subject matter expressly disclosed herein.

We claim:

1. A method for assuring the authenticity of a substance to be held within a glass or plastic container, comprising:
    writing a predetermined 3D code below a surface of the container, via a pulsed laser, to mark the container with the predetermined 3D code, whereby the predetermined 3D code is readable to verify the substance to be held in the container; and
    reading the predetermined 3D code that has been written into the container below the surface of the container, the reading occurring via optical coherence tomography (OCT) or parallel optical coherence tomography (pOCT) so as to measure features of the predetermined 3D code in all three dimensions including lateral positions and depths below the surface of the container, to thereby verify the authenticity of the substance to be held within the container.

2. The method of claim 1, wherein the writing occurs via a writing device, and further comprising:
    initially measuring a distance from the writing device to the surface of the container, and a contour of the surface, and then
    using the distance and the contour that has been measured during the writing of the predetermined 3D code below the surface of the container so as to locate the predetermined 3D code at a desired depth below the surface of the container, the measuring occurring within less than 1 second and accurate within 30 microns or better.

3. The method of claim 1, wherein:
    the writing uses short laser pulses having one of the following characteristics: 1-20 ps, 20-200 ps, ns, and 100 fs-1 ps.

4. The method of claim 1, wherein:
    the predetermined 3D code has a size range from 0.5 to 50 µm in transverse cross-sectional area.

5. The method of claim 1, wherein the container is a filled and closed syringe holding a substance to be authenticated.

6. The method of claim 1, further comprising:
    prior to the writing, filling the container with a substance and then closing the container, thereby to assure that the substance held with the container is associated with the predetermined 3D code.

7. The method of claim 1, wherein the predetermined 3D code includes a first code written at a first depth below the surface of the container and a second code written at a second depth below the surface of the container that is different than the first depth, with the first and second codes overlapping in position such that the second code cannot be tampered with except through a position of the first code.

8. The method of claim 7, wherein the first code defines an overt code containing open information, and the second code defines a cryptographic code containing encrypted information regarding an identity of the substance within the container.

9. A system for assuring the authenticity of a substance to be held within product containers, comprising:
    a plurality of product containers held within a tray, the tray movable along a process line, each of the product containers being formed from glass or plastic and defining a surface and a surface contour; and
    a frame located along the process line and movable relative to the tray;
    a writing apparatus mounted on the frame, and adapted to be moved by the frame relative to the tray so as to place the writing apparatus in alignment with each of the containers, the writing apparatus further including:

a measuring device that measures a distance between the writing apparatus and each of the surface and the surface contour of each of the product containers when in alignment with the writing apparatus, a laser device that directs a pulsed laser toward the surface of each of the product containers when in alignment with the writing apparatus, to create a predetermined 3D code below the surface thereof, and a controller that coordinates relative movement of the frame and the tray and that operates the writing apparatus, the measuring device, and the laser device such that the laser device writes the predetermined 3D code below the surface of each of the product containers; and a reading device operatively connected to the writing apparatus, the reading device reading the predetermined 3D code via optical coherence tomography (OCT) or parallel optical coherence tomography (pOCT) so as to measure features of the predetermined 3D code in all three dimensions including lateral positions and depths below the surface of the container, thereby to verify the authenticity of the substance to be held within the product containers.

10. The system of claim 9 wherein the plurality of product containers include syringes in a filled and closed condition, and each of the syringes has a flange, and wherein the writing of the predetermined 3D code occurs adjacent the flanges of the syringes.

11. The system of claim 9, wherein the writing device and the laser device use a short pulsed laser that has at least one of the following parameters: 1-20 ps, 20-110 ps, ns, and 100 fs-1 ps.

12. The system of claim 9, wherein the controller operates the laser device using the distance that has been measured by the measuring device so as to locate the predetermined 3D code at a desired depth below the surface of the container.

13. The system of claim 9, wherein the controller operates the laser device such that the predetermined 3D code includes a first code written at a first depth below the surface of the product container and a second code written at a second depth below the surface of the container that is different than the first depth, with the first and second codes overlapping in position such that the second code cannot be tampered with except through a position of the first code.

14. The system of claim 13, wherein the controller operates the laser device such that the first code defines an overt code containing open information, and the second code defines a cryptographic code containing encrypted information regarding an identity of the substance within the container.

* * * * *